United States Patent [19]

Andreasson

[11] Patent Number: 4,470,510

[45] Date of Patent: Sep. 11, 1984

[54] STORAGE DEVICE FOR SHEETS, WHICH ARE INTENDED TO BE EXPOSED, PARTICULARLY MICROFILMS

[76] Inventor: Ronny Andreasson, Lingonvägen 57 A, 448 00 Floda, Sweden

[21] Appl. No.: 358,189

[22] Filed: Mar. 15, 1982

[30] Foreign Application Priority Data

Mar. 23, 1981 [SE] Sweden .................................. 8101817

[51] Int. Cl.³ .......................................... B65D 85/67
[52] U.S. Cl. .................................. 206/455; 206/449; 206/454; 353/27 R; 353/DIG. 5
[58] Field of Search ............... 206/449, 450, 451, 452, 206/453, 454, 455, 456; 229/175; 353/27 A, 27 R, DIG. 5

[56] References Cited

U.S. PATENT DOCUMENTS

| | | | |
|---|---|---|---|
| 1,719,358 | 7/1929 | Campbell | 206/425 |
| 2,338,898 | 1/1944 | Bradner | 206/425 |
| 3,659,703 | 5/1972 | Oliver | 206/425 |
| 3,661,449 | 5/1972 | Wright | 353/27 R |
| 3,797,925 | 3/1974 | Smitzer | 353/27 R |
| 3,827,551 | 8/1974 | Croft | 206/451 |
| 3,993,405 | 11/1976 | Kinsinger et al. | 353/27 A |
| 4,006,980 | 2/1977 | Wells | 353/27 R |
| 4,025,177 | 5/1977 | Owens et al. | 353/27 A |
| 4,049,342 | 9/1977 | Hearon | 353/27 R |
| 4,054,378 | 10/1977 | Wells et al. | 353/27 R |
| 4,204,753 | 5/1980 | Kool et al. | 353/27 R |

FOREIGN PATENT DOCUMENTS 2242873 11/1975 France ................................ 206/454
6400918 6/1964 Netherlands ....................... 206/449

Primary Examiner—William T. Dixson, Jr.
Assistant Examiner—Jimmy G. Foster

[57] ABSTRACT

Storage device for sheets, which are intended to be exposed particularly microfilms, which device comprises a case in the form of a sleeve substantially rectangular in form and with an elongated substantially rectangular cross-section, in which case a space is provided and forms an elongated opening at one end of the sleeve, the space enclosing a number of envelopes and between the envelopes intersheets, the envelopes being slidable between a position substantially entirely within said space and protected by the sleeve and an outer position extending out through the opening and with the main part of the envelope outside the sleeve, in which outer position stopping means are provided to prevent the respective envelope to be entirely drawn out from the sleeve and removed from the same, the intersheets being fixed in the sleeve against sliding movement, the envelopes being made of transparent material and intended to store the sheets which have to be exposed in said outer position.

1 Claim, 5 Drawing Figures

STORAGE DEVICE FOR SHEETS, WHICH ARE INTENDED TO BE EXPOSED, PARTICULARLY MICROFILMS

The present invention relates to a storage device for sheets, which are intended to be exposed. Primarily, the storage device is intended for storage of microfilms in such a way that they can be exposed in a microfilm-viewer.

Documents are in increasing extent reproduced on microfilms or the variant microfiche in a very small scale for exposing to an observer by means of a viewer. For the storage of the microfilms envelopes are used with pockets for the films which usually are inserted in files. For the observing of the film the same sometimes together with the envelope is removed from the file and inserted into the viewer which means a risk for damage of the film, a loss of the same or that it will be re-inserted into the file in a wrong position. Often there are also difficulties to initially place the films in the right position in the viewer as it is difficult to get a clear view of the content of the film by means of the eye.

The present invention relates to a device for the storage of sheets and primarily, the storage device is intended for microfilms. However, it is possible to provide the storage device for other kind of sheets, which should be stored in a certain position but which should be easy accessible for the exposition to an observer without or by means of a viewer.

The object of the invention is to provide a storage device of the kind mentioned which will make it possible to expose the sheet without the need to separate the same from the storage device, whereby the risk of losing of the sheet or incorrect reinsertion is eliminated.

Another object of the invention is to provide a device in which the respective sheets are accessible only after a relatively complicated operation for opening the device so that the risk for unauthorized removing of the sheet from the storage device is prevented.

A further object of the invention is to provide a storage device which can be used in connection with a microfilm-viewer and thereby provide that the sheet will be inserted in the correct position.

In the accompanying drawings an embodiment of the invention is shown in the form of a storage device for microfilms.

Figure 1:
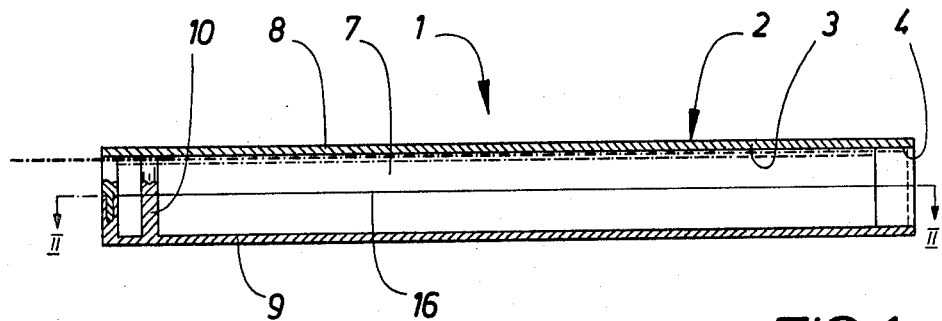
FIG. 1 is a sectional view of the device along the line I—I in FIG. 2.
Figure 2:
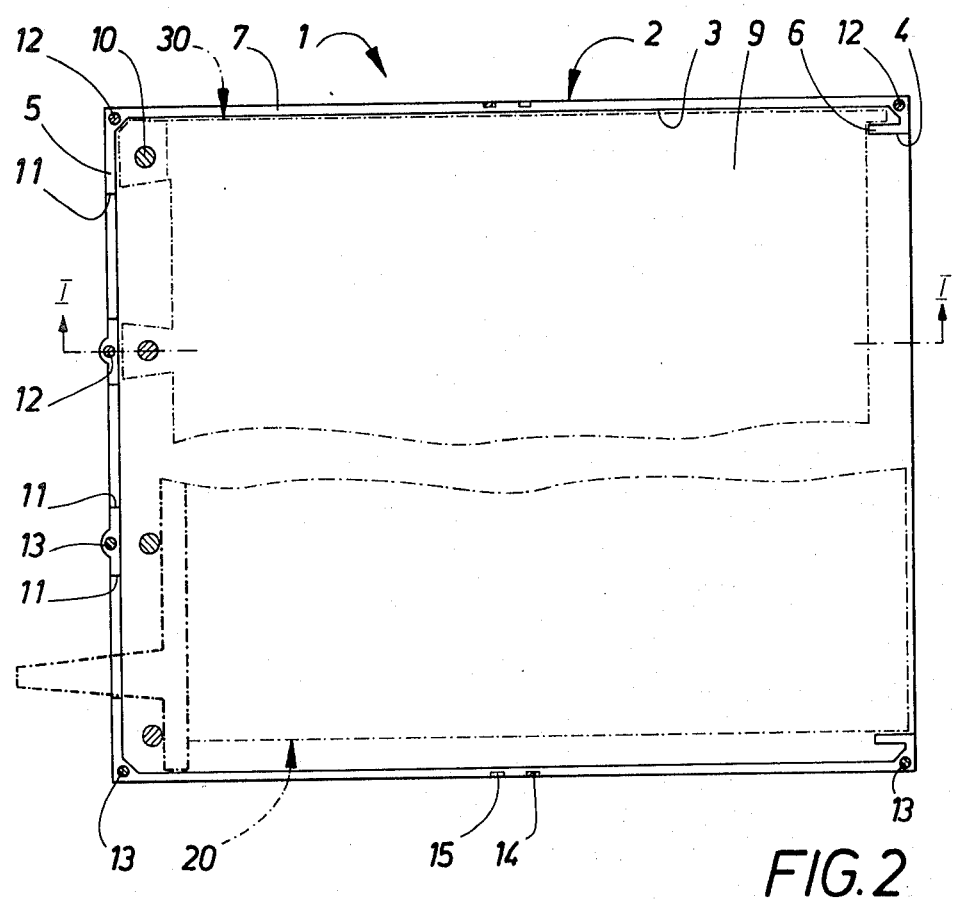
FIG. 2 is the device partly in a section and partly in a view in a parting line of a case made in two pieces extending along the line II—II in FIG. 1.
Figure 5:
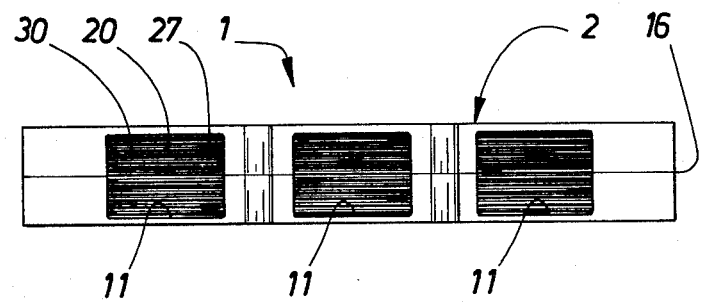
FIG. 5 shows a view of the device as seen from the left in FIG. 1.

According to FIG. 1 and 2 the device 1 comprises a case in the form of a sleeve 2, rectangular in form and with a flat cross-section (compare FIG. 5). In the case a space 3 is provided which extends through the sleeve and also has a flat crosssection. The space 3 has a front opening 4 and a rear wall 5 and extends from the latter to sidewalls 7. THe rear wall is provided with three openings 11. Projections 6 extend from the sidewalls 7 inwards in the front opening 4 and form small recesses parallel to the sidewalls 7. Between the sidewalls 7 extend walls defining the space 3, an upper wall 8 and a bottom wall 9. Both walls 8, 9 are substantially planar.

In the space 3 are situated interlocking elements pins 10 at the rear wall 5 and extending between the walls 8 and 9. In the rear wall 5 are provided three openings 11. Said pins 10 are situated in the front of the wall 5 opposite portions of wall 5 and between the openings 11.

The sleeve 2 is assembled from two halves meeting in a parting line 16. The halves are guiding each other by means of pins 12—15 each pin extending out from the one half and into a hole in the other half. Thereby the pins 13 are connected to the under half (below the parting line 16 in FIG. 1) and the pins 12 are connected to the upper half (above the parting line 16 in FIG. 1) the pins 12 and 13 are circular in section. The pins 14 and 15 are rectangular and have a width corresponding to about half the thickness of the wall 9. In contrast to the pins 12, 13 the pins 14, 15 are situated not in holes but in groves in the outer side of the walls 7. Said arrangement is chosen in order to find a connection between the walls of the upper and the lower halves without the need of any portions projecting out from the wall as the same has to be smooth on the inside as well as the outside in handling.

Also the pins 10 are devided in two halves. Accordingly the two upper most pins 10 extend upwards from the other half and the two lower most pins in FIG. 2 extend downward from the upper half. By said arrangement of the pins 10 and 12–15 and a symmetrical arrangement of the openings 11 the two halves can be equal to each other and can be moulded from plastic in the same mould. The two halves can be held together by making the pins 12, 13 with a tight fit in the corresponding holes of the halves can also be glued together after assembling.

Figure 3:
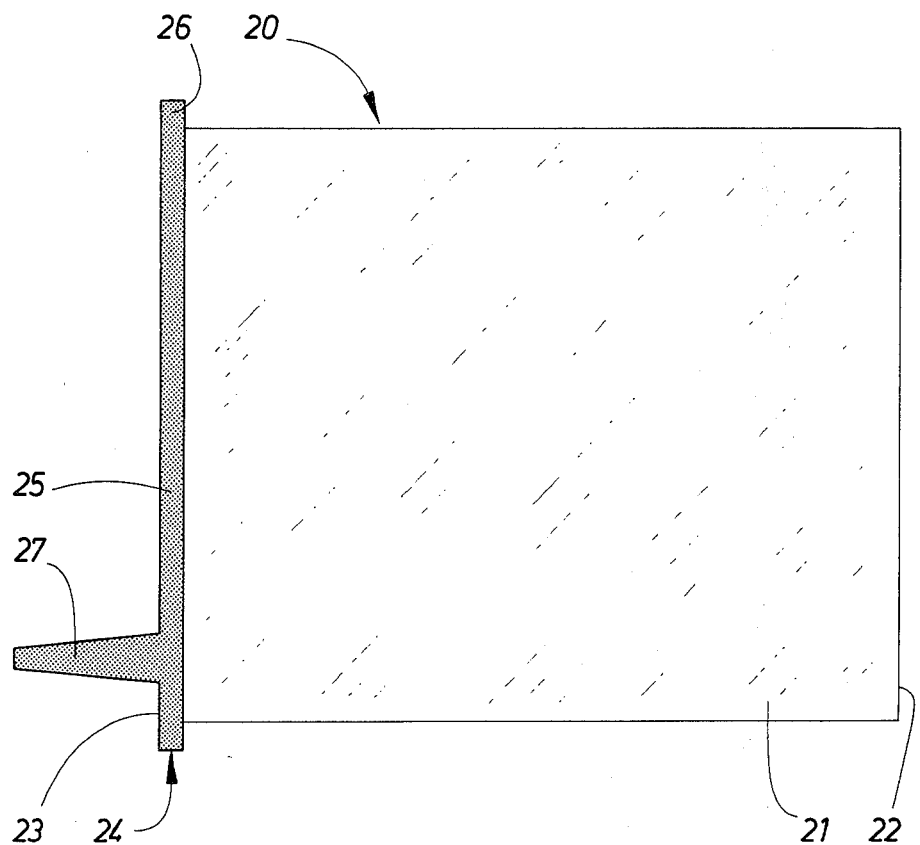
FIG. 3 shows a part of the device in horizontal view.

The storage device also comprises a number of envelopes 20, see FIG. 3 essentially rectangular in form. The envelopes comprises a main portion 21 and an end portion 24. The main portion is manufactured of two transparent plastic foils which are welded together at a front edge 22 and can also be welded along lines between the edges of the main portion. Between the foils are formed one or several pockets which are open at the side edges of the envelope. This pockets are intended for the storing of microfilms. For instance a pocket between welding lines can be intended to store the microfilm while another pocket can be used for an identification means. The envelope however can be arranged for different kinds of storage purposes, for example it can be divided in several pockets for the storage of a number of microfilms.

The end portion 24 is manufactured in relatively rigid plastic foil which is opaque and which preferably is made in a colour determined for identification purposes. The end portion comprises an elongated portion 25 following the edge of the main portion 21 and ending in projections 26. From the elongated portion 25 extends a tongue 27 the position of which along the elongated portion 25 is determined by the intended position of the different envelopes in a stack of envelopes in the space 3.

Figure 4:
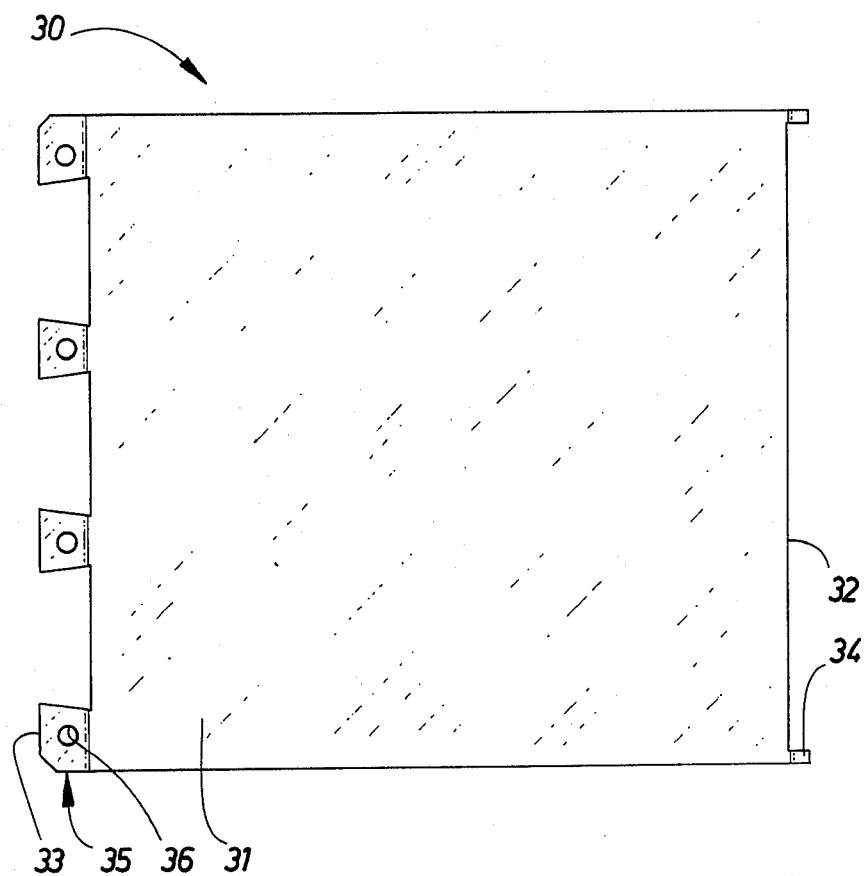
FIG. 4 shows another part of the device in a horizontal view.

The device also comprises intersheets 30 according to FIG. 4. These sheets are also manufactured in plastic foil and a neutral or coloured foil can be used. The intersheet is essentially rectangular including a main portion 31 with a front edge 32 with projections 34 at the corners. A rear edge 33 opposite to the front edge is provided with a number of projections 35 the sides of which are in an oblique angel to the rear edge. The projections 35 are provided with a hole 36 in each one. The distances between the holes are equal to the distances between the pins 10. In order to reinforce the projections 34 and 35 the plastic foil can be folded to a double layer which layers are welded together.

At the assembling of the device a number of envelopes 20 and intersheets 30 are stacked so that an intersheet always is positioned between two adjacent envelopes. The stack is mounted in the under half of the sleeve 2 in the way shown in FIG. 2 consequently with the holes 36 of the intersheets 30 passed over the pins 10 of the under half. The projections 34 are situated in the recesses between the projections 6 of the side walls 7. The envelopes 20 are positioned with the rear edges 23 of the same against the inner side of the rear wall 5. The tongues 27 will thereby extend through the openings 11. If the tongues are in different positions along the rear edge they will be spread out over the entire width of the endpiece as shown in FIG. 5 and will be easier to observe and manipulate than if they were arranged in one single column. Of course no tongues can be provided outside the openings 11.

After all the envelopes 20 and the intersheets 30 are placed in the under half, the upper half is mounted on the under half with its pins 10 entering the holes 36 in the intersheets. The pins 12-15 for the guiding of the two halves are inserted into the respective holes or grooves of the other half. As said before the halves are secured to each other by means of a tight fit between the pins and the corresponding holes or by gluing the two halves together.

The intersheets 30 are fixed in their positions as they are secured by means of the holes 36 situated on the pins 10 and the projections 6 of the sleeve retain the projections 34 of the sheets. The envelopes 20 however, are slidable between the position shown in FIG. 2 and a position in which the projections 26 rest against the inner end of the projections 6 in the front opening 4. The envelope in this position will be positioned outside the sleeve 2 with its main portion 21. Consequently the pocket enclosing the microfilm is exposed and can be inserted into a viewer for observation or copying. The projections 26 resting against the projections 6, however prevent the envelope from being removed from the storage device and when the viewing operation is ended the envelope is easy to push into the space 3 again.

When pulling the envelope 20 out of the sleeve 2 the same at first can be pushed outside the front opening 4 with its front edge portion by pushing the respective tongue 27 inwards so that the front edge portion can be grasped and the envelope can be drawn out until it reaches its outer position. As the intersheets 30 are fixed in their positions, they cannot slide out together with the envelope and they will also prevent the adjacent pocket to be drawn out by means of friction. In order to make it possible to identify the different tongues the sleeve can be provided with a stripe at the rear end carrying information related to the respective tongues.

When one wants to reinsert the envelope 20 in the sleeve the envelope is pushed inwards until the rear edge rests against the pins 10 as shown in FIG. 2. The stacks projections 35 of the intersheets 30 form openings in the front of the openings 11 which widen inwards which will facilitate the entering of the tongue 27. As the intersheets 30 have double material layers in the projections 34 and 35 a distance will be formed between two adjacent intersheets at the area formed by the main portion. In these spaces the envelopes 20 are positioned.

At the viewing the storage device can be positioned in the viewer and the envelopes can be placed in position for viewing one by one until the observer finds what he is searching for. As the envelopes can not easily be removed from the storage device the correct order of the envelopes is secured. For the storage of collection of microfilms it is very suitable to use a sufficient number of storage devices in which the respective microfilms will be protected from dust and damage and can easily be identified.

If one desires to protect the microfilms in the envelopes 20 to be removed or changed, the envelopes can be provided with an insertion opening at the rear end only. With such an arrangement the microfilms are not accessible as the envelopes can not be removed from the sleeve without parting the two halves from each other. In order to make the envelopes accessible for an authorized person the halves can be locked together so that a key is necessary for parting them in order to remove one of the envelopes for the removing or changing of the microfilm.

If the device is intended to be used for other purposes than storing microfilms the size of the device and the form of the envelopes have to be adapted to the object intended to be stored.

I claim:

1. A storage device for microfilms, comprising a flat case including an upper wall and a bottom wall connected by sidewalls and a front end and a rear end, a space rectangular in cross-section in said case having a height between the upper and bottom walls considerably narrower than the width between the side walls, an opening at the front end of the case extending between the upper and bottom walls, a plurality of microfilm carriers of a transparent material in the space and intended to store the microfilm, the main part of each carrier being of a width smaller than the width of the opening at the front end of the case, projections at the sidewalls of said case extending into the opening, at least one further opening at the rear end of the case, said microfilm carriers being in the form of envelopes made of a thin, soft material such as plastic foil and provided with projections at an edge thereof directed towards the rear end of the case, said projections on said envelopes extending outside of the innermost portions of said projections at the sidewalls of said case which extend into the opening at the front end of the case, and a tongue at said edge of each envelope extending from said edge and dimensioned to extend outside the case through said further opening at the rear end of the case when the respective envelope is stored in the case with said edge thereof adjacent to said rear end of the case, intersheets positioned between the respective envelopes and forming with the envelopes a compact stack in said space, and fixation means for the intersheets comprising interlocking elements extending between the upper and bottom walls at the rear end of the case, said interlocking elements extending through holes in the intersheets, whereby the envelopes can be pushed one by one outside the opening at the front end of the case with a front portion thereof by means of the tongues projecting through the further opening at the rear end of the case and drawn out of the case by means of said front portion until said projections of an envelope rest against the projections at the sidewalls of the case which extend into the opening at the front end of the case, while the intersheets are fixed in their positions in the case and prevent adjacent envelopes from following the envelope which is drawn out by friction.

* * * * *